INVENTOR.
Roy S. Williams
BY Rice and Rice
ATTORNEYS.

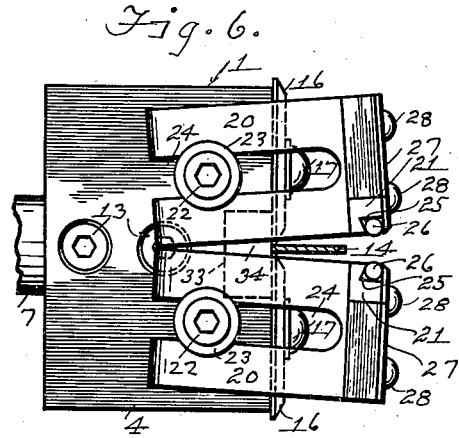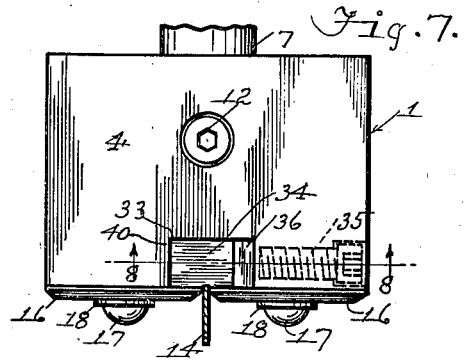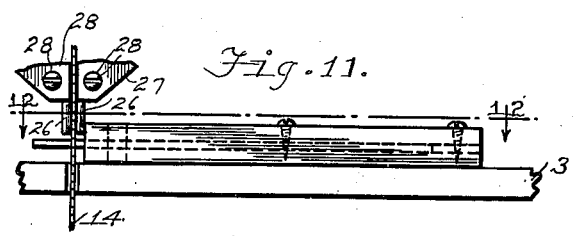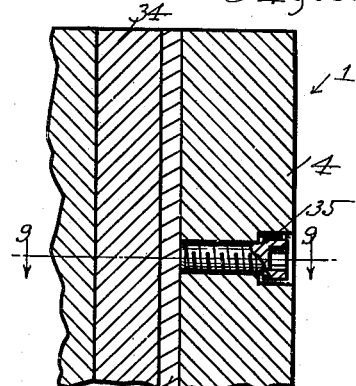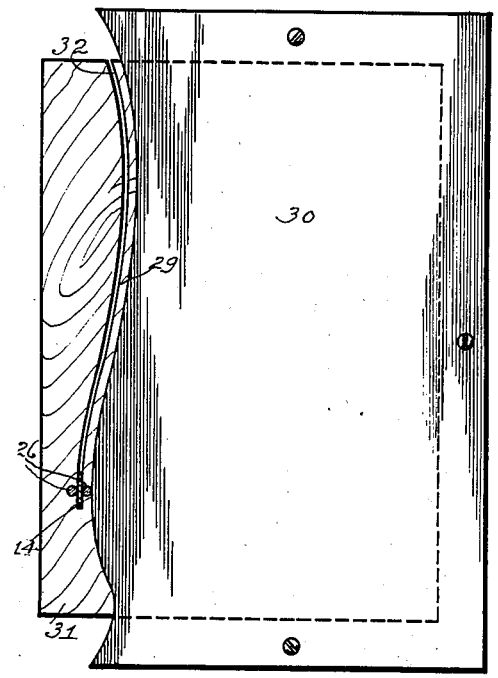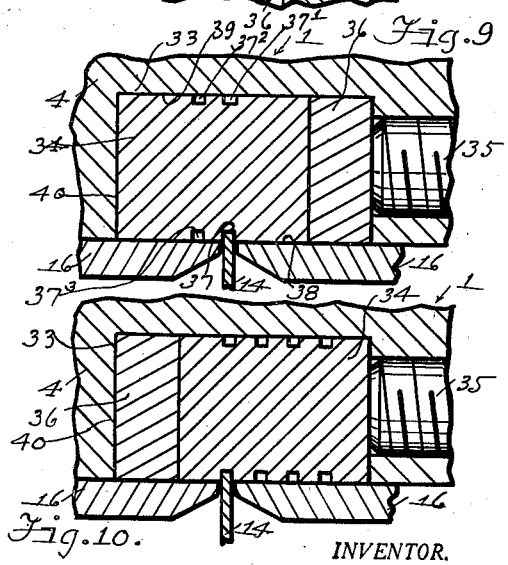

Patented Nov. 4, 1941

2,261,816

UNITED STATES PATENT OFFICE 2,261,816

SAW GUIDE

Roy S. Williams, Grand Rapids, Mich.

Application November 25, 1938, Serial No. 242,213

3 Claims. (Cl. 143—160)

The present invention relates to guides for saws, particularly band saws, jig saws and the like; and its object is to provide such a guide having improved means for mounting it on a sawing machine for movement to various adjusted positions; and further, to provide such a guide having improved guiding members for the saw movable on the body member thereof to various adjusted positions; and further, to provide in such a guide an improved member on which the rear edge of the saw bears, movable to different positions on said body member.

These and any other objects hereinafter appearing are attained by, and the invention finds preferable embodiment in, the illustrative structure particularly described in the body of this specification and illustrated by the accompanying drawings, in which:

Figure 6 is a bottom plan view of the guide, similar to Figure 3 but showing some parts in a different position;

Figure 7 is a top plan view of the guide;

Figure 8 is a horizontal sectional view of the same taken on line 8—8 of Figure 7;

Figure 9 is an enlarged vertical sectional view thereof taken on line 9—9 of Figure 8;

Figure 10 is a like view of the same showing the parts in a different position;

Figure 11 is an elevational front view of a lower portion of the guide with a work piece and pattern therefor on the machine's table;

Figure 12 is a top plan view of the work piece and pattern therefor.

Figures 3, 4, 5:
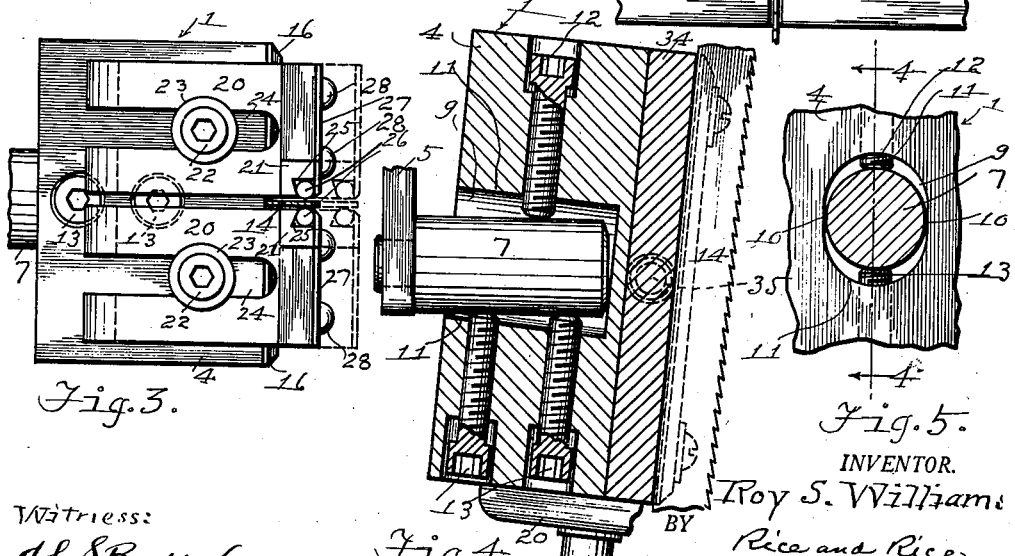
Figure 3 is a bottom plan view of the guide, the saw being shown sectioned on line 3—3 of Figure 1.
Figure 4 is a vertical sectional view thereof taken on line 4—4 of Figure 5.
Figure 5 is a vertical sectional view of a portion of the same taken on line 5—5 of Figure 1.

As illustrated by these drawings, the saw guide designated generally 1 is mounted on the upstanding part 2 of a sawing machine above its table 3. This guide has a body member 4 thus mounted by means of the mounting member 5 which has horizontal parallelly spaced spindle portions 6, 7, the rearwardly extending spindle 6 being turnable in the rotary bearing 8 in said part 2, and the spindle 7 extending forwardly into an opening 9 in the rear side of the body member, said opening having parallel lateral sides 10 spaced apart a distance equal to the diameter of spindle 7 and upper and lower sides 11 spaced apart farther than are the sides 10, as best seen in Figure 5. The said opening 9 is thus vertically elongated in cross section.

A vertically disposed upper set screw 12 and a pair of vertically disposed lower set screws 13, threaded in the body member and extending into said opening are turnable into engagement with the spindle 7 at its upper and lower sides respectively the upper screw thus engaging the spindle at a point axially between the points of the lower screws' engagement, as best seen in Figure 4.

The guide is thus mounted for three turning movements for three purposes: a raising or lowering bodily movement by turning the spindle 6 in the bearing 8, for adjusting the position of the guide above the table 3; a rotatable movement about spindle 7 to tilt the guide laterally, for adjusting the direction of movement of the saw 14 relatively to the right hand and left hand sides of the table; and a turnable movement about a horizontal axis parallel with the table's front to tilt the guide forwardly-rearwardly, for adjusting the direction of the saw's movement relatively to the front and rear of the table.

Figures 1, 2:
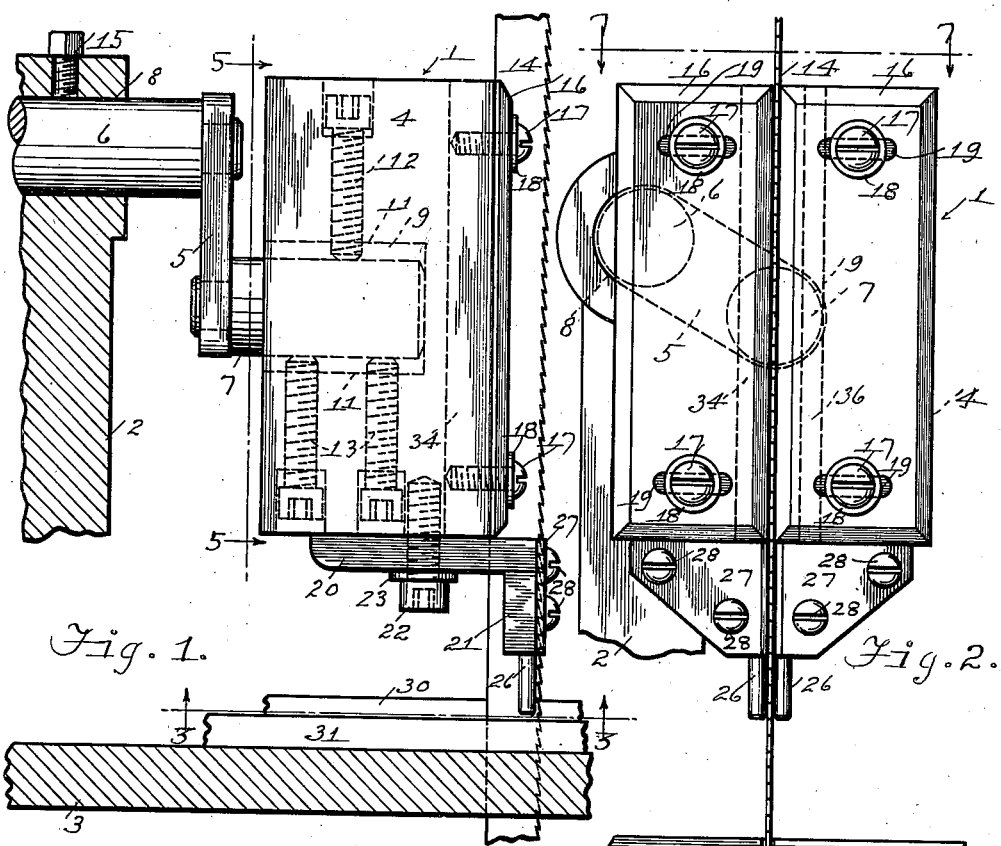
Figure 1 is an elevational left hand-side view of a guide for band saws and the like, and the saw guided thereby, with portions of the sawing machine shown in vertical section and a work piece and pattern therefor.
Figure 2 is an elevational front view of the guide and table, showing the guide in a position above the table higher than in Figure 1.

Not only may the guide as an entirety be thus moved to nicely adjusted positions and held therein by turning down said set screws 12, 13 and the set screw 15 threaded in the part 2 as indicated in Figures 4 and 1 respectively, but the saw is with like nicety adjustable in guided position on the body member 4, by the following means. The saw, adjacent its smooth rear edge bears between a pair of upper guide members, the plates 16, secured on the front of the body member by headed binding screws 17 provided with washers 18, extending through these members' horizontally elongated slots 19 and threaded in the body member.

These plates may be relatively moved laterally for accommodating saws of different thicknesses, or moved together to shift the position of the saw laterally, and are held in adjusted positions by turning down the screws 17.

The saw, adjacent its serrated front edge bears between a pair of lower guide members, the plates 20, having downwardly extending front portions 21 and are secured on the bottom of the body member by headed screws 22 provided with washers 23, and extending through these members' forwardly-rearwardly elongated slots 24 spacedly therefrom, the screws being threaded in the body member.

These members 20, movable independently of the guide members 16, may be moved together forwardly-rearwardly to accommodate saws of different forward-rearward widths, and relatively to each other to accommodate saws of different thicknesses, and are held in their adjusted positions by turning down the screws 22.

These guide members 20 are shown in solid lines in Figure 3 in position for accommodating a saw of narrow forward-rearward width, and in broken lines in a position for a saw of greater width; and in Figure 6 these guide members are shown moved to an extreme position.

In rabbets 25 in said portions 21 of these guide members 20, vertical rods 26, between which the saw adjacent its front edge bears, are held by plates 27 clamped thereon by turning down their binding screws 28 threaded in said portions. These rods extend below said portions 21 so that one of them may slide along the edge 29 of a hollow pattern 30 containing a work piece 31 as illustrated in Figure 12 wherein the saw is shown cutting the work piece along the kerf 32.

The body member 4 has in its front side a vertical groove 33 containing a cross-sectionally rectangular block or bar 34 on which the smooth rear edge of the saw slidably bears, this bar being held in the groove by turning down the set screw 35 threaded in the body member. A spacer 36 may be inserted in the groove between the screw and the bar 34 as seen in Figure 9, and when the saw has worn a gutter 37 in one side 38 thereof, the bar may be inserted with its opposite side 39 outwardly; when a gutter 37¹ is worn therein, the bar may be turned end for end and inserted in the groove; and when gutter 37² is worn, the bar may be inserted to again present its side 38 outwardly whereupon a fourth gutter 37³ is worn by the saw. Or the spacer 36 may be placed between the bar and the end 40 of the groove as seen in Figure 10, so that eight kerfs may be worn in the bar before discarding it.

The invention being intended to be pointed out in the claims, is not to be limited to or by details of construction of the particular embodiment thereof illustrated by the drawings or hereinbefore described.

I claim:

1. A guide for a band saw or the like, comprising: a body member having means for guiding the saw and an opening in its side vertically elongated in cross-section; and a member for mounting the body member on a sawing machine, having laterally spaced spindles one of which is turnable to adjusted positions in a bearing in the machine, the other spindle extending into said opening spacedly from the upper and lower sides thereof, the body member having a fulcrum in said opening and vertically opposite thereto a threaded plurality of vertically disposed set screws forwardly-rearwardly spaced and extending into said opening and turnable into engagement with one vertical side of said other spindle therein for holding the body member in adjusted forwardly-rearwardly tilted positions on said fulcrum.

2. A guide for a band saw or the like, comprising: a body member having means for guiding the saw and an opening in its side vertically elongated in cross-section and having parallel vertical sides; and a member for mounting the body member on a sawing machine, having laterally spaced spindles one of which is turnable to adjusted positions in a bearing in the machine, the other spindle extending into said opening spacedly from the upper and lower sides thereof and bearing on its parallel vertical sides, the body member having a fulcrum in said opening and vertically opposite thereto a threaded plurality of vertically disposed set screws forwardly-rearwardly spaced and extending into said opening and turnable into engagement with one vertical side of said other spindle therein for holding the body member in adjusted forwardly-rearwardly tilted positions on said fulcrum.

3. A guide for a band saw or the like, comprising: a body member; a pair of parallel saw-guiding members having forwardly-rearwardly elongated slots with binding screws extending therethrough spacedly therefrom and threaded in the body member for mounting said pair for movement to adjusted positions on the body member, forwardly-rearwardly for accommodating saws of different widths and relatively laterally for accommodating saws of different thicknesses; bearing members extending below said pair; and plates having screws extending therethrough and threaded in the body member for clamping said bearing members between said plates and the body member.

ROY S. WILLIAMS.